Figure 2:
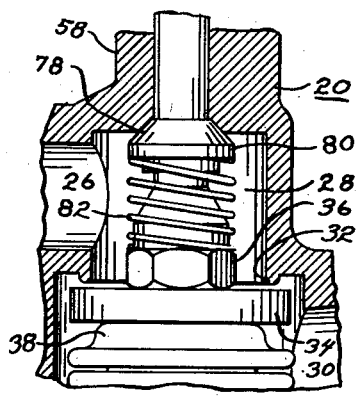

Oct. 30, 1951      W. W. WATT      2,573,522

VALVE WITH VIBRATION DAMPER

Filed Sept. 8, 1947

INVENTOR.
William W Watt
BY
Spencer Hardman and Fehr
attorneys

Patented Oct. 30, 1951

2,573,522

UNITED STATES PATENT OFFICE 2,573,522

VALVE WITH VIBRATION DAMPER

William Wilbur Watt, Dayton, Ohio, assignor to General Motors Corporation, Dayton, Ohio, a corporation of Delaware Application September 8, 1947, Serial No. 772,625

7 Claims. (Cl. 137—153)

This invention relates to valves such as may be used in refrigerating systems but it is also applicable to valves used in other fields for controlling the flow of fluids.

There is a tendency for many valves of a wide variety of types and sizes to vibrate and be noisy under certain conditions of fluid flow. Obviously the noise is objectionable and the vibrations accelerate wear upon the moving parts of the valve and the seat. This vibration and noise are more often found in large valves.

It is an object of my invention to provide a valve which is quiet and will not vibrate.

It is another object of my invention to provide a damping means for preventing vibration and noise in a valve.

It is another object of my invention to provide a simple dash-pot arrangement in a fluid-operated valve to prevent vibration and noise.

These objects are attained by providing a ring-shaped spring-pressed check valve member with a close sliding fit on the valve stem which will regulate the flow of fluid into and out of the interior of the bellows chamber of a fluid motor valve which ring-shaped member also acts as a friction damper on the valve stem.

Further objects and advantages of the present invention will be apparent from the following description, reference being had to the accompanying drawing, wherein a preferred form of the present invention is clearly shown.

Figure 1:
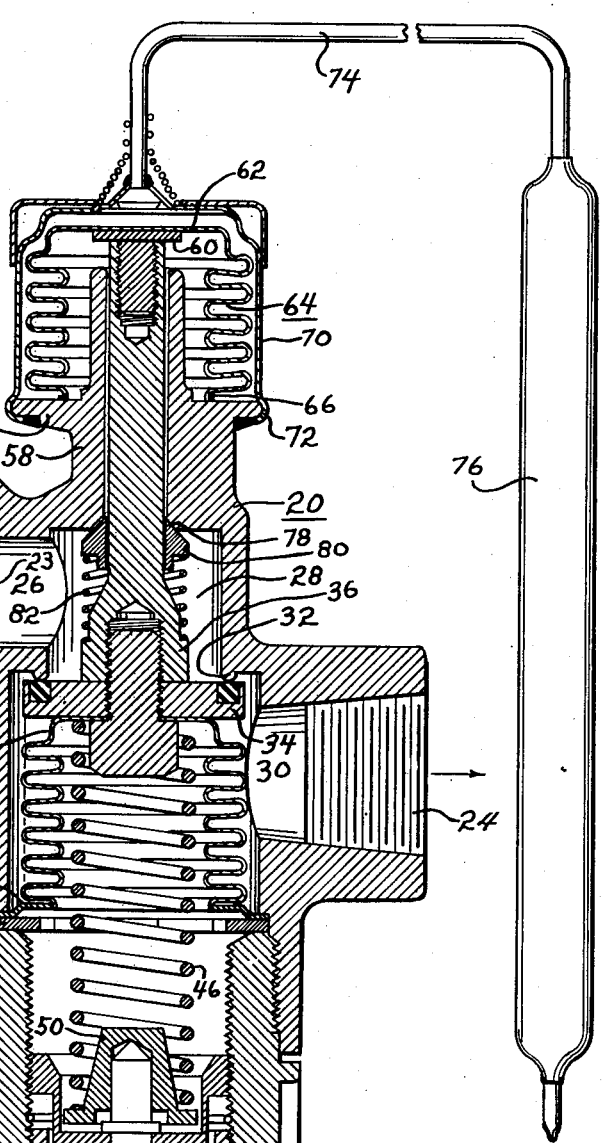
Figure 3:
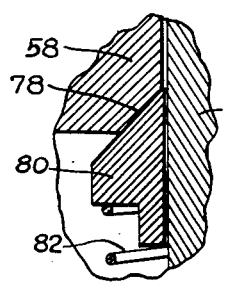

In the drawing:

Fig. 1 is a vertical sectional view through the valve embodying my invention; and Fig. 2 is a fragmentary vertical sectional view showing the valve member and associated parts in elevation.

My invention in the form of a friction damper is applicable to automatic valves which are provided with a valve stem or the equivalent thereof. In its function as a combined friction damper and as a part of a simple dash-pot arrangement it is applicable generally to all valves operated by a fluid motor and other valves having a diaphragm with one side operatively connected to the valve stem. To illustrate my invention, I have chosen as an example a fluid motor-operated valve such as may be used as an evaporator outlet valve in a refrigerating system.

Referring now to the drawing and more particularly to Fig. 1, there is shown a valve body 20 having an inlet 22 protected with a screen 23, an outlet 24, a passage 26 connecting the inlet 22 with the valve chamber 28, and a passage 30 connecting the valve chamber 28 with the outlet 24. The valve body 20 is provided with a valve seat surface 32 in the valve chamber 28 between the passages 26 and 30.

Adapted to move into sealing engagement with the seat surface 32 is the valve member 34 having a seating surface formed by a ring of a synthetic rubber-like material, which is held within an annular groove in the metal portion of the valve member 34, as clearly shown in Fig. 1. The valve member 34 is fastened to the bottom of a valve stem 36 by a screw which holds the upper closed end of a flexible metal bellows 38 in sealing engagement with the lower face of the valve member 30. The rim 40 at the lower open end of the bellows 38 is sealed to the walls of the valve body 20 by a washer 42 and a gland nut 44. The valve member 34 is resiliently urged to closed position by a compression type coil spring 46 having its upper end pressing upwardly against the upper closed end of the bellows 38 and its lower end held by a thimble-shaped spring retainer 50 supported by a conical pointed pin 52 in turn held by a cup-shaped adjusting nut 54 threaded into the interior of the gland nut 44. The interior of the gland nut 44 is sealed by a cap nut 56. The cap nut 54 may be rotated to vary the tension of the spring 46 and in this way the force required to open the valve is regulated. The fluid force on the outlet side of the valve upon the valve member 34 is balanced by the fluid force upon the bellows 38 which has an effective diameter substantially equal to the diameter of the valve seat 32.

The valve stem 36 extends upwardly through the valve guide portion 58 provided in the valve body above the valve chamber 28. The upper end of the valve stem 36 is drilled and adapted to receive a large flat headed screw 60, which rests against the closed upper end 62 of the main operating bellows 64 of the fluid motor which is used to open and hold open the valve member 34. The lower open end 66 of the main bellows 64 is sealed to an annular flange portion 68 provided as a part of the valve body 20 surrounding the guide portion 58. Enclosing the bellows 64 is a cap member 70, the lower rim 72 of which is sealed to the flange 68. The closed upper end is pierced and one end of a capillary tube 74 extends into this aperture and is sealed to the cap member 70 at that point providing communication with the interior of the fluid motor chamber provided between the bellows 64 and the cap member 70. The other end of the capillary tube 74 is connected to a thermostat bulb 76 which may be filled with a volatile liquid or a vapor, or it may be filled with a suitable absorbent or adsorbent and a gas or vapor which may be absorbed and driven out from the absorbent or adsorbent. The varying pressures created within the bulb 76 are communicated through the capillary tube 74 to the fluid chamber provided between the bellows 64 and the cap 70. The pressure within this chamber forces downwardly the closed upper end 62 of the bellows 64 and this exerts the pressure upon the top of the valve stem 36 to move the valve member 34 to the open position and to hold it open.

The valve is substantially balanced against pressures on the inlet side since the fluid pressure on the inlet side of the valve member 34 pushes downwardly upon it and this pressure also is communicated through the passage in the valve stem guide 58 surrounding valve stem 36 to the interior of the bellows 64 which has substantially the same effective diameter as the valve seat 32, which defines the areas of the effective pressure upon the valve member 34. The valve stem 36 has a customary amount of clearance within its valve stem guide 58 which is sufficient to permit normal fluid flow from the valve chamber 28 into and out of the interior of the bellows 64.

I have found that valves of this and other types tend to vibrate and be noisy under certain flow conditions. According to my invention I have added a simple device which acts as a friction damper and also causes the interior of the bellows 64 to become a dash-pot chamber which aids the damper in damping vibrations and preventing noise. To do this I provide a beveled valve seat 78 in the top of the valve chamber 28 immediately surrounding the valve stem 36. Normally held upon this seat 78 is a ring-shaped valve member 80 having a beveled upper valve seat surface complementary to the valve seat surface 78. This ring-shaped valve member 80 is mounted upon the valve stem 36 with a close sliding fit with about .001" clearance. The customary clearance provided for the valve stem 36 in its guide 58 is much greater than this close sliding fit with about .001" clearance. A light compression coil spring 82 presses upwardly against a shoulder provided upon the ring valve member 80. At its lower end the spring 82 is held by a shoulder provided upon the valve stem 36 as shown.

With this arrangement, the ring valve member 80 provides a restriction upon the flow of fluid from the interior of the bellows 64 to the valve chamber 28 when the bellows 64 is compressed due to increasing pressures created within the bulb 76. When the pressure within the bellows 64 is great enough, however, it can lift the valve 80 off its seat to permit the escape of fluid. When the pressure within the bulb 76 diminishes the bellows 64 will expand upwardly. Pressure within the bellows 64 will then become less than the pressure within the valve chamber 28. The pressure within the valve chamber 28 cannot open the valve 80 but a small amount can leak by the clearance between the ring 80 and the valve stem 36 into the interior of the bellows 64, so that the valve member 80 converts the interior of the valve into the dash-pot arrangement which prevents vibration and noise.

The ring member 80 also due to its close sliding fit upon the valve stem 36 acts as a friction damper to assist the dash-pot arrangement in preventing vibration and noise. Even though there is a small clearance between the ring member 80 and the valve stem 36 the inevitable rubbing of the stem 36 against one side of the ring 80 provides sufficient friction to dampen minute vibrations and for preventing the minute vibrations from becoming greater so that these vibrations are quickly suppressed. The dash-pot arrangement is more effective against the vibrations of large amplitude. The ring mem-preventing vibration and noise. The ring member 80 has another function. This ring member, by the interengagement of the beveled seat surfaces serves to keep the valve stem 36 centrally located in the valve stem guide passage thereby permitting the valve stem 36 to move with uniform freeness. It should be noted that the friction between the ring member 80 and the valve stem 36 cannot prevent the opening of the valve 34, since if the friction becomes too great the valve 80 will be carried downwardly with the valve member 34. The device which provides the friction damping and creates a dash-pot action is simple and inexpensive and applicable to valves of a wide variety of types and sizes.

While the form of embodiment of the invention as herein disclosed, constitutes a preferred form, it is to be understood that other forms might be adopted, as may come within the scope of the claims.

What is claimed is as follows:

1. A valve including a valve body having an inlet and an outlet, a valve member within the valve body for controlling the flow of fluid from the inlet to the outlet, a motor supported by the valve body, a valve stem extending between the motor and the valve member, said valve body having a guide portion surrounding the valve stem, said guide portion being provided with a valve seat surface surrounding the valve stem, a ring member slidably mounted upon said valve stem with a close sliding fit, said ring member being also provided with a valve seat surface concentric with and having such a diameter as to fit the valve seat surface upon the guide portion, and spring means for yieldingly urging the ring member to yieldingly hold the seat surfaces in engagement.

2. A valve including a valve body having an inlet and an outlet, a valve member within the valve body for controlling the flow of fluid from the inlet to the outlet, a motor supported by the valve body, a valve stem extending between the motor and the valve member, said valve body having a guide portion surrounding the valve stem, said guide portion being provided with a valve seat surface surrounding the valve stem, a ring member slidably mounted upon said valve stem with a close sliding fit, said ring member being also provided with a valve seat surface concentric with and having such a diameter as to fit the valve seat surface upon the guide portion, one of said seat surfaces being beveled to facilitate centering the valve stem.

3. A valve including a valve body having an inlet and an outlet and a passage connecting the inlet and the outlet, said valve body having a valve seat surface formed in said passage, a valve member adapted to fit said seat surface, a motor mounted upon the valve body, a valve stem extending between the motor and the valve member, said body having a guide portion surrounding the valve stem, a ring member slidably mounted upon said valve stem with a close sliding fit, said ring member being provided with a beveled valve seat surface, said guide portion being provided with a valve seat surface complementary to said beveled valve seat surface, and spring means mounted upon the valve stem acting upon said ring member to yieldingly hold said complementary surfaces in engagement.

4. A valve including a valve body having an inlet and an outlet and a passage connecting the inlet and outlet provided with a valve seat surface, a valve member within the valve body adapted to engage said valve seat, said body being provided with a valve stem guideway extending from said passageway, a valve stem connected to said valve member and extending within said guideway, a diaphragm means located adjacent said guideway and having its edges sealed to the valve body around said guideway and having its central portion adapted to contact said valve stem, the portion of the body surrounding the opening of the guideway into the passageway being provided with a small valve seat surface, a ring valve member mounted with a close sliding fit upon said valve stem and having a valve seat surface complementary to the small valve seat surface, and a coil spring threaded upon said valve stem and extending into contact with said ring valve member to resiliently hold the ring member upon its seat.

5. A valve including a valve body having an inlet and an outlet and a passage connecting the inlet and outlet provided with a valve seat surface, a valve member within the valve body adapted to engage said valve seat, said body being provided with a valve stem guideway extending from said passageway, a valve stem connected to said valve member and extending within said guideway, a diaphragm means located adjacent said guideway and having its edges sealed to the valve body around said guideway and having its central portion adapted to contact said valve stem, the portion of the body surrounding the opening of the guideway into the passageway being provided with a small valve seat surface, a ring valve member mounted with a close sliding fit upon said valve stem and having a valve seat surface complementary to the small valve seat surface, and a coil spring threaded upon said valve stem and extending into contact with said ring valve member to resiliently hold the ring member upon its seat, a cap member enclosing the diaphragm means and forming a closed chamber, and means connected to said chamber for exerting a pressure therein to operate the valve.

6. A valve including a valve body having an inlet and an outlet, a valve member within the valve body for controlling the flow of fluid from the inlet to the outlet, a motor supported by the valve body, a valve stem extending between the motor and the valve member, said valve body having a guide portion surrounding the valve stem, said guide portion being provided with a valve seat surface surrounding the valve stem, a ring member slidably mounted upon said valve stem with a close sliding fit, said ring member being also provided with a valve seat surface concentric with and having such a diameter as to fit the valve seat surface upon the guide portion, said valve body and said motor being arranged to provide a closed chamber adjacent the place of association between the valve stem and the motor, said valve body being provided with a valve chamber containing the valve member, said guide portion and said stem being arranged to provide a passage between them extending from said valve chamber to said closed chamber, and spring means mounted upon said valve stem for yieldingly urging the ring member to yieldingly hold the seat surfaces in engagement.

7. A valve including a valve body having an inlet and an outlet, a valve member within the valve body for controlling the flow of fluid from the inlet to the outlet, a motor supported by the valve body, a valve stem extending between the motor and the valve member, said valve body having a guide portion surrounding the valve stem, said guide portion being provided with a valve seat surface surrounding the valve stem, a ring member slidably mounted upon said valve stem with a close sliding fit, said ring member being also provided with a valve seat surface concentric with and having such a diameter as to fit the valve seat surface upon the guide portion, and spring means for yieldingly urging the ring member to yieldingly hold the seat surfaces in engagement, said valve body and said motor being arranged to provide a closed chamber adjacent the place of association between the motor and the stem, said valve body being provided with a passage extending from within said valve seat surface to said closed chamber.

WILLIAM WILBUR WATT.

REFERENCES CITED

The following references are of record in the file of this patent:

UNITED STATES PATENTS

| Number | Name | Date |
|---|---|---|
| 378,609 | Moore | Feb. 28, 1888 |
| 417,112 | Steininger | Dec. 10, 1889 |
| 2,158,436 | Shaw | May 16, 1939 |
| 2,158,715 | Beekley | May 16, 1939 |
| 2,178,974 | Smith | Nov. 7, 1939 |
| 2,216,296 | Raymond | Oct. 1, 1940 |
| 2,318,161 | Johnson | May 4, 1943 |
| 2,365,650 | Shaw | Dec. 14, 1944 |